(12) United States Patent
Schiller

(10) Patent No.: US 11,971,321 B2
(45) Date of Patent: Apr. 30, 2024

(54) MONITORING MIRROR REFLECTANCE USING SOLAR ILLUMINATION

(71) Applicant: Raytheon Company, Tewksbury, MA (US)

(72) Inventor: Stephen J. Schiller, La Mirada, CA (US)

(73) Assignee: Raytheon Company, Tewksbury, MA (US)

(*) Notice: Subject to any disclaimer, the term of this patent is extended or adjusted under 35 U.S.C. 154(b) by 298 days.

(21) Appl. No.: 17/612,102

(22) PCT Filed: May 22, 2019

(86) PCT No.: PCT/US2019/033463
§ 371 (c)(1),
(2) Date: Nov. 17, 2021

(87) PCT Pub. No.: WO2020/236165
PCT Pub. Date: Nov. 26, 2020

(65) Prior Publication Data
US 2022/0214246 A1    Jul. 7, 2022

(51) Int. Cl.
*G01M 11/00* (2006.01)
*F24S 23/70* (2018.01)
(Continued)

(52) U.S. Cl.
CPC .......... *G01M 11/005* (2013.01); *G01N 21/95* (2013.01); *F24S 23/70* (2018.05);
(Continued)

(58) Field of Classification Search
CPC ..... G01M 11/005; G01N 21/95; G01N 21/94; G01N 2021/9511; F24S 23/70; F24S 2023/832; F24S 40/90; H02S 40/22
See application file for complete search history.

(56) References Cited

U.S. PATENT DOCUMENTS 9,482,583 B1   11/2016  Zavodny et al.
2014/0071449 A1*  3/2014  Robinson ............... G01J 3/2823
                                                                356/328
(Continued)

FOREIGN PATENT DOCUMENTS

DE   102012215153 B3   11/2013
DE   102017211466 B3   10/2018
(Continued)

OTHER PUBLICATIONS (DE 102012215153 B3, Espacenet translation) (Year: 2013).*
(Continued)

*Primary Examiner* — Michelle M Iacoletti
*Assistant Examiner* — Carlos Perez-Guzman
(74) *Attorney, Agent, or Firm* — Schwegman Lundberg & Woessner, P.A.

(57) ABSTRACT

A system (100) and method can monitor a reflectance of a mirror target that includes at least one curved mirror (M). The system (100) can take a first irradiance measurement of the sun (S), the first irradiance measurement representing a direct solar irradiance. The system (100) can take a second irradiance measurement that represents an irradiance from a reflection of the sun (S) from the mirror target plus background irradiance from a reflection of the sky from the mirror target. The system (100) can take a third irradiance measurement that represents the background irradiance from the reflection of the sky from the mirror target. The system (100) can determine a reflectance of the mirror target from the first, second, and third irradiance measurements. The system (100) can compare the reflectance to a specified reflectance threshold, and, upon determining that the reflectance of the mirror target is less than the specified reflectance threshold, can generate an alert signal.

20 Claims, 4 Drawing Sheets

(51) Int. Cl.
G01N 21/95 (2006.01)
H02S 40/22 (2014.01)
(52) U.S. Cl.
CPC . *F24S 2023/832* (2018.05); *G01N 2021/9511* (2013.01); *H02S 40/22* (2014.12)

(56) References Cited

U.S. PATENT DOCUMENTS

2014/0152985 A1* 6/2014 Buchhorn ............. G01J 3/0291
356/326
2014/0332688 A1* 11/2014 Cothuru .................. F24S 40/90
250/353
2020/0043710 A1* 2/2020 Meng ................ H01J 37/32449

FOREIGN PATENT DOCUMENTS

EP      2579016 A1    4/2013
EP      2597458 A1    5/2013
WO   WO-2020236165 A1   11/2020

OTHER PUBLICATIONS

"International Application Serial No. PCT/US2019/033463, International Search Report dated Jan. 31, 2020", 5 pgs.
"International Application Serial No. PCT/US2019/033463, Written Opinion dated Jan. 31, 2020", 7 pgs.
Jose, Zapata I, et al., "Estimation of average mirror reflectivity using digital photographs and specular reflectometer measurement", Asia-Pacific Solar Research Conference, (Dec. 1, 2015).

* cited by examiner

MONITORING MIRROR REFLECTANCE USING SOLAR ILLUMINATION

This application is a U.S. National Stage Filing under 35 U.S.C. 371 from International Application No. PCT/US2019/033463, filed May 22, 2019, and published in English as WO 2020/236165 on Nov. 26, 2020, which is incorporated herein by reference in its entirety.

TECHNICAL FIELD

The present disclosure relates generally to monitoring a reflectance of one or more mirrors.

BACKGROUND

There are applications for which it is important to monitor a reflectance of a mirror or an array of mirrors referred to as a mirror target. For example, in some solar energy and remote sensing applications, a mirror or an array of mirrors can be located outdoors. Being positioned outdoors can degrade the mirror or mirrors over time, such as through solarization, non-uniform age degradation, and soiling. To ensure proper performance in these systems, it is beneficial to monitor a reflectance of the mirror or mirrors.

SUMMARY

In one example, a method for monitoring a reflectance of a mirror target that includes at least one curved mirror can include: obtaining a first irradiance measurement of the sun, the first irradiance measurement representing a direct solar irradiance; obtaining a second irradiance measurement that represents an irradiance from a reflection of the sun from the mirror target plus background irradiance; obtaining a third irradiance measurement that represents the background irradiance; determining a reflectance of the mirror target from the first, second, and third irradiance measurements; determining that the reflectance of the mirror target is less than a specified reflectance threshold; and in response to the determination that the reflectance of the mirror target is less than the specified reflectance threshold, generating an alert signal.

In another example, a system to measure a reflectance of a mirror target that includes at least one curved mirror can include: an irradiance spectrometer; a spectrometer actuator configured to control an orientation of the irradiance spectrometer; at least one processor to control the irradiance spectrometer and the spectrometer actuator, the at least one processor configured to: point foreoptics of the irradiance spectrometer directly at the sun such that the sun is within a field of view of the irradiance spectrometer; with the foreoptics of the irradiance spectrometer pointed directly at the sun while the sun is within the field of view of the irradiance spectrometer, obtain a first irradiance measurement with the irradiance spectrometer; point the foreoptics of the irradiance spectrometer directly at the mirror target such that a reflection of the sun from the mirror target is within the field of view of the irradiance spectrometer; with the foreoptics of the irradiance spectrometer pointed directly at the mirror target while the reflection of the sun from the mirror target is within the field of view of the irradiance spectrometer; obtain a second irradiance measurement with the irradiance spectrometer; removing the reflection of the sun from the field of view of the irradiance spectrometer; with the foreoptics of the irradiance spectrometer pointed directly at the mirror target while the reflection of the sun is removed from the field of view of the irradiance spectrometer, obtain a third irradiance measurement with the irradiance spectrometer; and determine a reflectance of the mirror target from the first, second, and third irradiance measurements.

In another example, a method for measuring a reflectance of a mirror target that includes at least one curved mirror can include: pointing foreoptics of an irradiance spectrometer directly at the sun such that the sun is within a field of view of the irradiance spectrometer; with the foreoptics of the irradiance spectrometer pointed directly at the sun while the sun is within the field of view of the irradiance spectrometer, taking a first irradiance measurement with the irradiance spectrometer, the first irradiance measurement representing a direct solar irradiance; pointing the foreoptics of the irradiance spectrometer directly at the mirror target such that a reflection of the sun from the mirror target is within the field of view of the irradiance spectrometer; with the foreoptics of the irradiance spectrometer pointed directly at the mirror target while the reflection of the sun from the mirror target is within the field of view of the irradiance spectrometer, taking a second irradiance measurement with the irradiance spectrometer, the second irradiance measurement representing an irradiance from a reflection of the sun from the mirror target plus background irradiance from a reflection of the sky from the mirror target; removing the reflection of the sun from the field of view of the irradiance spectrometer; with the foreoptics of the irradiance spectrometer pointed directly at the mirror target while the reflection of the sun is removed from the field of view of the irradiance spectrometer, taking a third irradiance measurement with the irradiance spectrometer, the third irradiance measurement representing the background irradiance from the reflection of the sky from the mirror target; and determining, with at least one processor coupled to the irradiance spectrometer, a reflectance of the mirror target from the first, second, and third irradiance measurements; determining, with the at least one processor, that the reflectance of the mirror target is less than a specified reflectance threshold; and in response to the determination that the reflectance of the mirror target is less than the specified reflectance threshold, automatically generating an alert signal.

DETAILED DESCRIPTION

A system and method can monitor a reflectance of a mirror target that includes at least one curved mirror. The system can take a first irradiance measurement of the sun, the first irradiance measurement representing a direct solar irradiance. The system can take a second irradiance measurement that represents an irradiance from a reflection of the sun from the mirror target plus background irradiance from a reflection of the sky from the mirror target. The system can take a third irradiance measurement that represents the background irradiance from the reflection of the sky from the mirror target. The system can determine a reflectance of the mirror target from the first, second, and third irradiance measurements. The system can compare the reflectance to a specified reflectance threshold, and, upon determining that the reflectance of the mirror target is less than the specified reflectance threshold, can generate an alert signal.

The calculations can be performed using knowledge that the mirror or mirrors are curved. Such curved mirrors can reflect the sun to produce an image of the sun. The image can be virtual or real. The radius of curvature of the mirror or mirrors is known, so that the image of the sun can be located with respect to the mirror location. The calculations discussed in detail below are based on the assumption that that light propagates away from the image of the sun according to radiometric principles (e.g., that for the purposes of the calculations, the image of the sun can be approximated as a point source of light).

Basing a reflectance measurement on the assumption that that light propagates away from the image of the sun according to radiometric principles can have advantages over some other measurement techniques.

For example, as a first advantage, compared to a measurement technique in which a mirror reflectance is measured over a relatively small area of a mirror, the measurement technique discussed below can measure a performance of a full area or a relatively large area of the mirror. This can account for area-to-area variations in reflectance that may not be addressed by the small-area technique.

As another example, as a second advantage, compared to a measurement technique in which mirror reflectance is measured using discrete wavelengths, such as generated from artificial light sources, such as laser diodes or light emitting diodes, the measurement technique discussed below can use solar illumination to measure a reflectance over a full (e.g. continuous) wavelength range, rather than at one or more discrete wavelengths. This can provide a more accurate representation of mirror performance than the discrete case.

Figure 1:
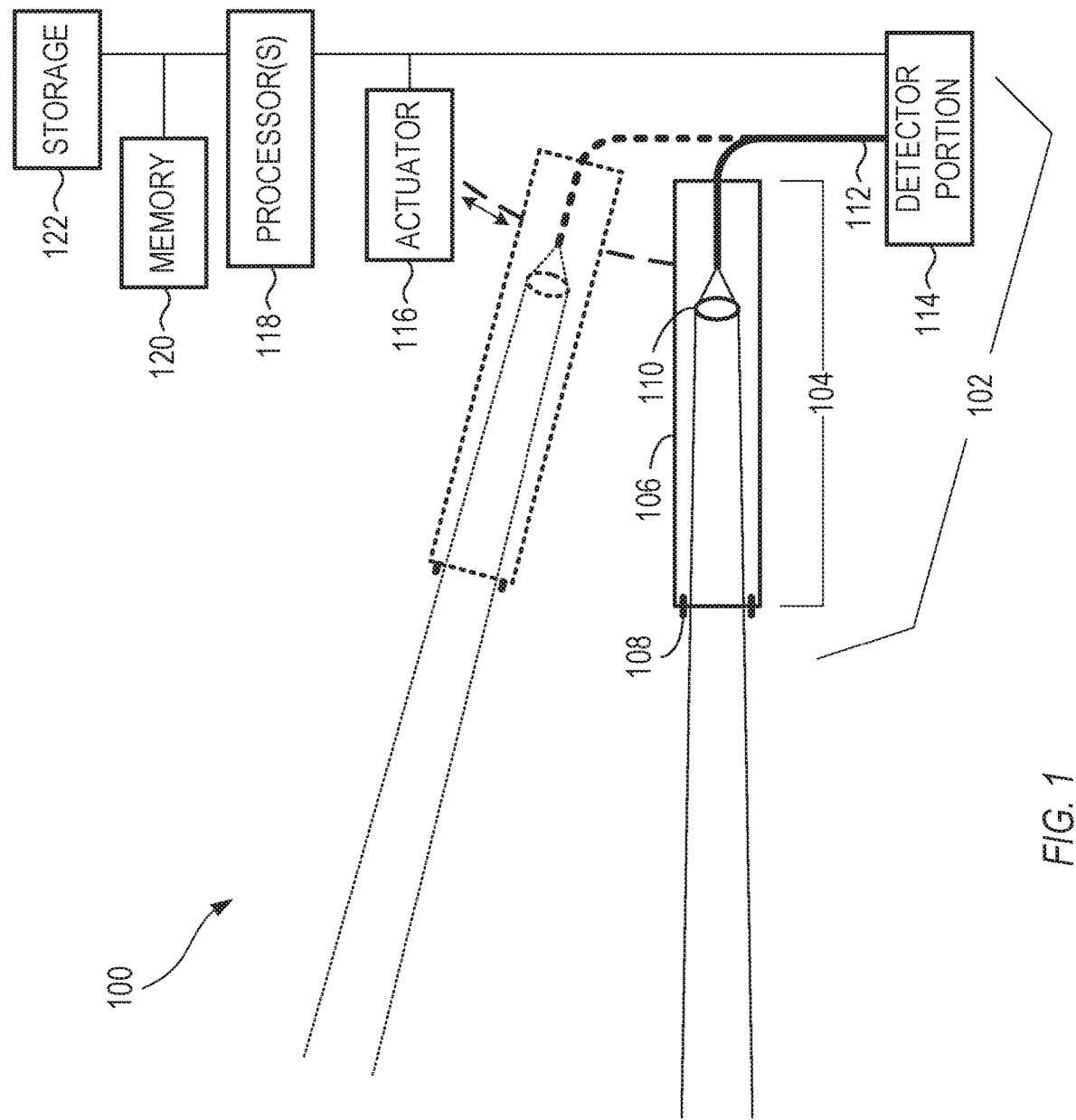
FIG. 1 shows an example of a system to measure a reflectance of a mirror target (M) that includes at least one curved mirror, in accordance with some embodiments.
Figure 1:
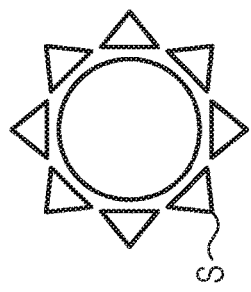
Figure 1:
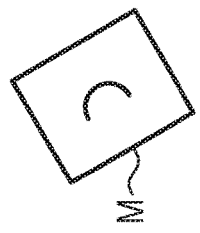

FIG. 1 shows an example of a system 100 to measure a reflectance of a mirror target (M) that includes at least one curved mirror, in accordance with some embodiments. The mirror target (M) is not part of the system 100. The system 100 of FIG. 1 is but one example of a system that can measure the reflectance of a mirror target (M); other systems can also be used.

The system 100 can include an irradiance spectrometer 102, which can measure the irradiance of a light source, as a function of wavelength. Irradiance represents a radiant flux (e.g., power) received by a surface per unit area, and has units of power per area; such as watts per square meter in international System of Units (SI) units. Irradiance, as a function of wavelength, can have units of radiant flux per unit area, per wavelength. Other suitable units can also be used.

The irradiance spectrometer 102 can include foreoptics 104, which can be positioned to collect light within a specified angular field of view, from a specified direction. The foreoptics 104 can include an elongated housing 106. The foreoptics 104 can include an input aperture 108 positioned at or near one end of the housing 106. The input aperture 108 can optionally be controllable in diameter, to adjust a field of view of the irradiance spectrometer 102. Reducing the field of view can help reduce background input into the foreoptics 104 and may additionally reduce stray light. The foreoptics 104 can include a diffuse transmittance cosine receptor 110, which can receive light that propagates through the input aperture 108 and along the elongated housing 106. The diffuse transmittance cosine receptor 110 can couple the received light into an optical fiber 112. The optical fiber 112 can be flexible, and can optionally exit the foreoptics 104 through a longitudinal end of the housing 106; at the end opposite the input aperture 108. The optical fiber 112 can direct the received light to a detector portion 114 of the irradiance spectrometer 102. The detector portion 114 can be located separate from the foreoptics 104. In some examples, the detector portion 114 can remain stationary as the foreoptics 104 is positioned and repositioned. The detector portion 114 can include one or more sensors that can convert the received light into an electrical signal suitable for processing downstream. This is just one example of a configuration of foreoptics 104 for an irradiance spectrometer 102; other configurations can also be used.

A spectrometer actuator 116 can control an orientation of the irradiance spectrometer 102. For example, the spectrometer actuator 116 can position the spectrometer actuator 116 to point the foreoptics 104 at a specified object. In some examples, the specified object can be stationary, such as a mirror target (M). In other examples, the specified object can be moving, such as the sun. The spectrometer actuator 116 can be coupled to a processor 118 that can specify a particular position, such as the sun (S) at a specified time of day. As a specific example, the processor 118 can optionally account for variation in the sun's position in the sky over the course of a year, and can perform tracking suitable for pointing the foreoptics 104 at the sun (S) at roughly the same time every day.

At least one processor 118 can control the irradiance spectrometer 102 and the spectrometer actuator 116. In some examples, the at least one TO processor 118 can be referred to as a spectrometer controller. In some examples, the system 100 can include processing circuitry, which can include one or more processors 118, and memory 120, including instructions that, when executed by the processing circuitry, cause the processing circuitry to perform particular operations. In some examples, the system 100 can include a computer-readable storage medium 122 storing instructions that, when executed by processing circuitry, cause the processing circuitry to perform particular operations.

The at least one processor 118 can perform controlling tasks, such as driving the spectrometer actuator 116 to one or more specified positions. The at least one processor 118 can perform collection tasks, such as processing signals from the irradiance spectrometer 102 to form specified irradiance measurements. The at least one processor 118 can perform analyzing tasks, such as combining the irradiance measurements to determine a value of reflectance. The at least one processor 118 can perform scheduling tasks, such as repeating the irradiance measurements regularly, such as daily or weekly, or irregularly according to a specified pattern.

In some examples, the at least one processor 118 can include a single processor that performs all of the above tasks. In other examples, the at least one processor 118 can include multiple processors, in a same location or optionally in different locations. For examples that use multiple processors, two processors can perform two different tasks from those listed above.

To measure the reflectance of the mirror target (M), the system can perform the following tasks.

The at least one processor 118 can point the foreoptics 104 of the irradiance spectrometer 102 directly at the sun (S)

such that the sun (S) is within a field of view of the irradiance spectrometer 102. With the foreoptics 104 of the irradiance spectrometer 102 pointed directly at the sun (S) while the sun (S) is within the field of view of the irradiance spectrometer 102, the system 100 can obtain a first irradiance measurement with the irradiance spectrometer 102. In some examples, obtaining the first irradiance measurement can include taking the first irradiance measurement of the sun (S). The first irradiance measurement can represent a direct solar irradiance.

The at least one processor 118 can point the foreoptics 104 of the irradiance spectrometer 102 directly at the mirror target (M) such that a reflection of the sun (S) from the mirror target (M) is within the field of view of the irradiance spectrometer 102. With the foreoptics 104 of the irradiance spectrometer 102 pointed directly at the mirror target (M) while the reflection of the sun (S) from the mirror target (M) is within the field of view of the irradiance spectrometer 102, the system 100 can obtain a second irradiance measurement with the irradiance spectrometer 102. In some examples, obtaining the second irradiance measurement can include taking the second irradiance measurement from a reflection of the sky from the mirror target (M). The second irradiance measurement can represent an irradiance from a reflection of the sun (S) from the mirror target (M) plus background irradiance from a reflection of the sky from the mirror target (M).

The at least one processor 118 can remove the reflection of the sun (S) from the field of view of the irradiance spectrometer 102. For example, the mirror target (M) can be rotated to move the image of the sun (S) out of the field of view of the foreoptics 104, or a light baffle can be moved in front of the mirror target (M). Removing the sun (S) from the field of view is discussed in detail below.

With the foreoptics 104 of the irradiance spectrometer 102 pointed directly at the mirror target (M) while the reflection of the sun (S) is removed from the field of view of the irradiance spectrometer 102, the system 100 can obtain a third irradiance measurement with the irradiance spectrometer 102. In some examples, obtaining the third irradiance measurement can include taking the third irradiance measurement from the reflection of the sky from the mirror target (M). The third irradiance measurement can represent the background irradiance from the reflection of the sky from the mirror target (M).

The at least one processor 118 can determine a reflectance of the mirror target (NI) from the first, second, and third irradiance measurements. In some examples, the at least one processor 118 can take the first, second, and third irradiance measurements within a specified time frame, to reduce or minimize atmospheric effects on the first, second, and third irradiance measurements. The specified time frame can include five seconds, ten seconds, twenty seconds, thirty seconds, one minute, or any other suitable time frame.

To determine if the mirror target (M) is performing as specified, the at least one processor 118 can compare the determined reflectance to a specified reflectance threshold. If the reflectance is at or above the threshold, the mirror target (M) can be considered to be performing as specified, so that the system 100 need not take any additional action. If the reflectance is below the threshold, the mirror target (NI) can be considered to be malfunctioning, such as due to soiling or due to fading from sun exposure. The specified threshold can include a single number, such as a percentage that is integrated over a particular wavelength range, or a plurality of values, such as a set of values that correspond to specified wavelengths in a wavelength range.

For the case of a malfunctioning mirror target (M), the system can send an alert signal to one or more systems, such as through a network connection. Specifically, the at least one processor 118 can determine that the reflectance of the mirror target (M) is less than a specified reflectance threshold. In response to the determination that that the reflectance of the mirror target (M) is less than the specified reflectance threshold, the at least one processor 118 can automatically generate an alert signal. For example, the system 100 can send the alert signal to a processor that monitors a communication or power-generation system, so that the communication or power-generation system can send a technician to the mirror array (NI) to perform suitable repairs. The alert signal can be an analog electrical signal, a digital signal, or a combination of an analog signal and a digital signal. The alert signal can be delivered by a wired electrical connection, a wireless connection, and/or an optical medium.

In some examples, the at least one processor 118 can determine the reflectance of the mirror target (M) from the first, second, and third irradiance measurements by calculating a difference between the second irradiance measurement and the third irradiance measurement, and dividing the difference by the first irradiance measurement.

In some examples, the at least one processor 118 can determine the reflectance of the mirror target (M) by calculating a quantity according to the following Eq. (1):

$$\rho(\lambda) = \frac{4H^2}{R^2} \frac{(E_{m+b}(H, \lambda) - E_b(H, \lambda))}{E_S(\lambda)}, \qquad (1)$$

where quantity $\lambda$ is a wavelength, quantity $\rho(\lambda)$ is a reflectance of the mirror target as a function of wavelength, quantity H is a distance from the irradiance spectrometer to an image of the sun as formed by the mirror target, quantity R is a radius of curvature of the at least one curved mirror in the mirror target, quantity $E_S(\lambda)$ is the first irradiance measurement, quantity $E_{m+b}(H, \lambda)$ is the second irradiance measurement, and quantity $E_b(H, \lambda)$ is the third irradiance measurement. The Appendix derives Eq. (1) from radiometric principles.

Figure 2:
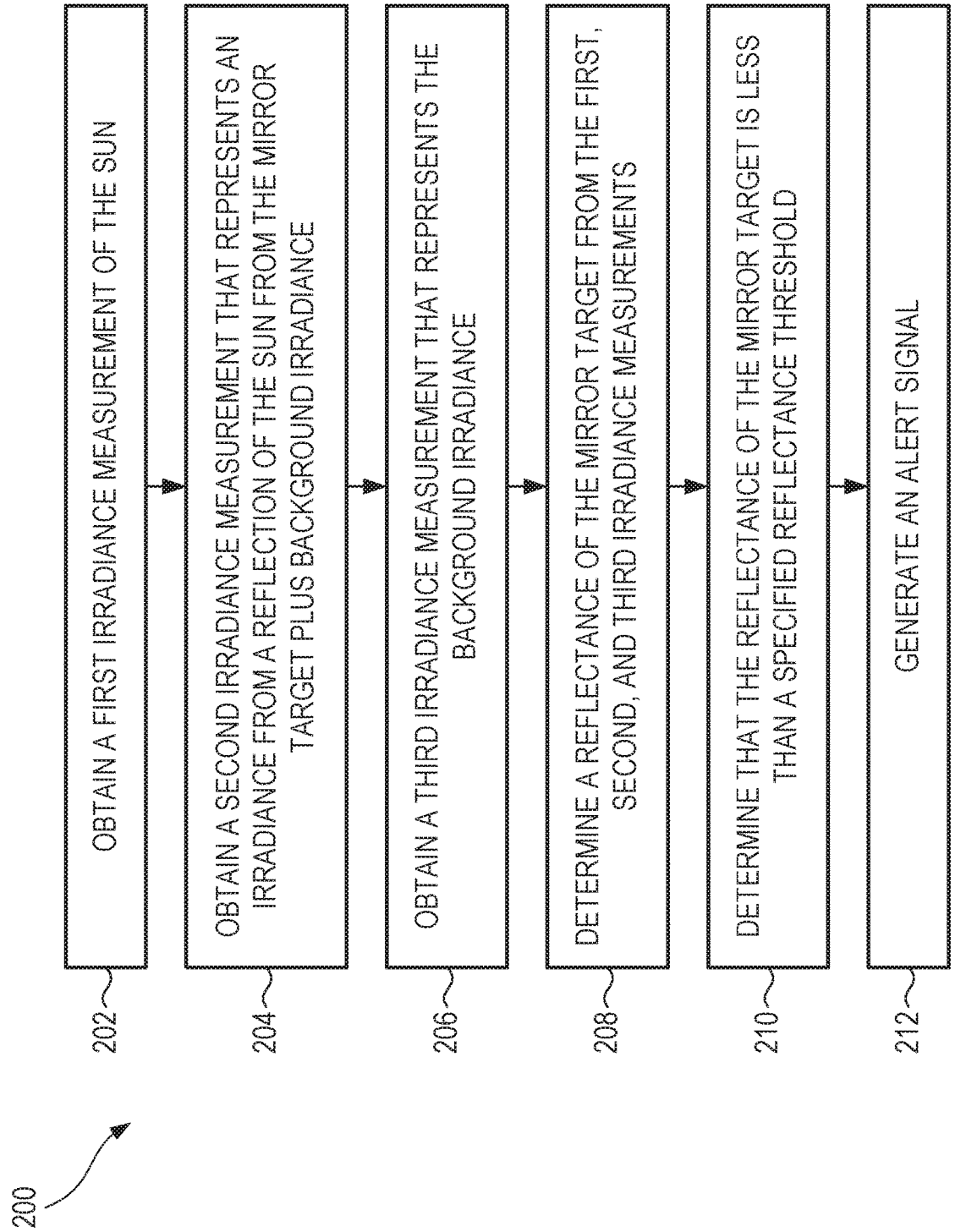
FIG. 2 shows an example of a method for monitoring a reflectance of a mirror target that includes at least one curved mirror, in accordance with some embodiments.

FIG. 2 shows an example of a method 200 for monitoring a reflectance of a mirror target that includes at least one curved mirror, in accordance with some embodiments. The method 200 can be used with the system 100 shown in FIG. 1 under control of at least one processor 118, and can be used with other systems. The method 200 is but one example of a method that can monitor reflectance; other suitable methods can also be used.

At operation 202, the system can obtain a first irradiance measurement of the sun. The first irradiance measurement can represent a direct solar irradiance. In some examples, the system 100 can take the first irradiance measurement of the sun (S). In some examples, the system 100 can point foreoptics 104 of an irradiance spectrometer 102 directly at the sun (S) such that the sun (S) is within a field of view of the irradiance spectrometer 102. In some examples, with the foreoptics 104 of the irradiance spectrometer 102 pointed directly at the sun (S) while the sun (S) is within the field of view of the irradiance spectrometer 102, the system 100 can take the first irradiance measurement with the irradiance spectrometer 102.

At operation 204, the system can obtain a second irradiance measurement that represents an irradiance from a reflection of the sun (S) from the mirror target (M) plus background irradiance. In some examples, the system 100 can take the second irradiance measurement from a reflection of the sky, from the mirror target (M). In some examples, the system 100 can point the foreoptics of the irradiance spectrometer 102 directly at the mirror target (M) such that a reflection of the sun (S) from the mirror target (M) is within the field of view of the irradiance spectrometer 102. In some examples, with the foreoptics 104 of the irradiance spectrometer 102 pointed directly at the mirror target (M) while the reflection of the sun (S) from the mirror target (M) is within the field of view of the irradiance spectrometer 102, the system 100 can take the second irradiance measurement with the irradiance spectrometer 102.

At operation 206, the system can obtain a third irradiance measurement that represents the background irradiance. In some examples, the system 100 can take the third irradiance measurement from the reflection of the sky from the mirror target (M). In some examples, the system 100 can remove the reflection of the sun (S) from the field of view of the irradiance spectrometer 102. In some examples, with the foreoptics 104 of the irradiance spectrometer 102 pointed directly at the mirror target (M) while the reflection of the sun (S) is removed from the field of view of the irradiance spectrometer 102, the system 100 can take the third irradiance measurement with the irradiance spectrometer 102. In some examples, to remove the reflection of the sun (S) from the field of view of the irradiance spectrometer 102, the system 100 can rotate the mirror target (M) to reposition the reflection of the sun (S) from the mirror target (M) to lie outside the field of view of the irradiance spectrometer 102. In some examples, to remove the reflection of the sun (S) from the field of view of the irradiance spectrometer 102, the system 100 can actuate a light baffle, proximate the mirror target (M), into an optical path between the mirror target (M) and the foreoptics 104 of the irradiance spectrometer 102 to block the reflection of the sun (S) from the field of view of the irradiance spectrometer 102. Discussion below provides additional details regarding how to remove the reflection of the sun (S) from the field of view of the irradiance spectrometer 102. In some examples, the system 100 can take the first, second, and third irradiance measurements within a specified time frame, to reduce or minimize atmospheric effects on the first, second, and third irradiance measurements.

At operation 208, the system can determine a reflectance of the mirror target from the first, second, and third irradiance measurements. In some examples, the system 100 can calculate a difference between the second irradiance measurement and the third irradiance measurement, and divide the difference by the first irradiance measurement.

At operation 210, the system can determine that the reflectance of the mirror target is less than a specified reflectance threshold.

At operation 212, the system can, in response to the determination that the reflectance of the mirror target is less than the specified reflectance threshold, generate an alert signal.

It is instructive to consider several techniques that can be used to TO remove the reflection of the sun from the field of view of the irradiance spectrometer, so that the system can obtain the third irradiance measurement with the irradiance spectrometer.

In a first technique, the mirror target, or the mirrors in the mirror target, can rotate to reposition the reflection of the sun from the mirror target to lie outside the field of view of the irradiance spectrometer. With the rotation being performed in this manner, the field of view of the irradiance spectrometer includes only sky, which lies adjacent to the sun.

In a second technique, the system can physically block a portion of the field of view of the irradiance spectrometer to account for the effects of the sun in the irradiance measurements. This second technique, also referred to as an extrapolation technique, can apply to cases for which the mirror target or mirrors in the mirror target are unable to rotate, and other suitable cases.

Figure 3:
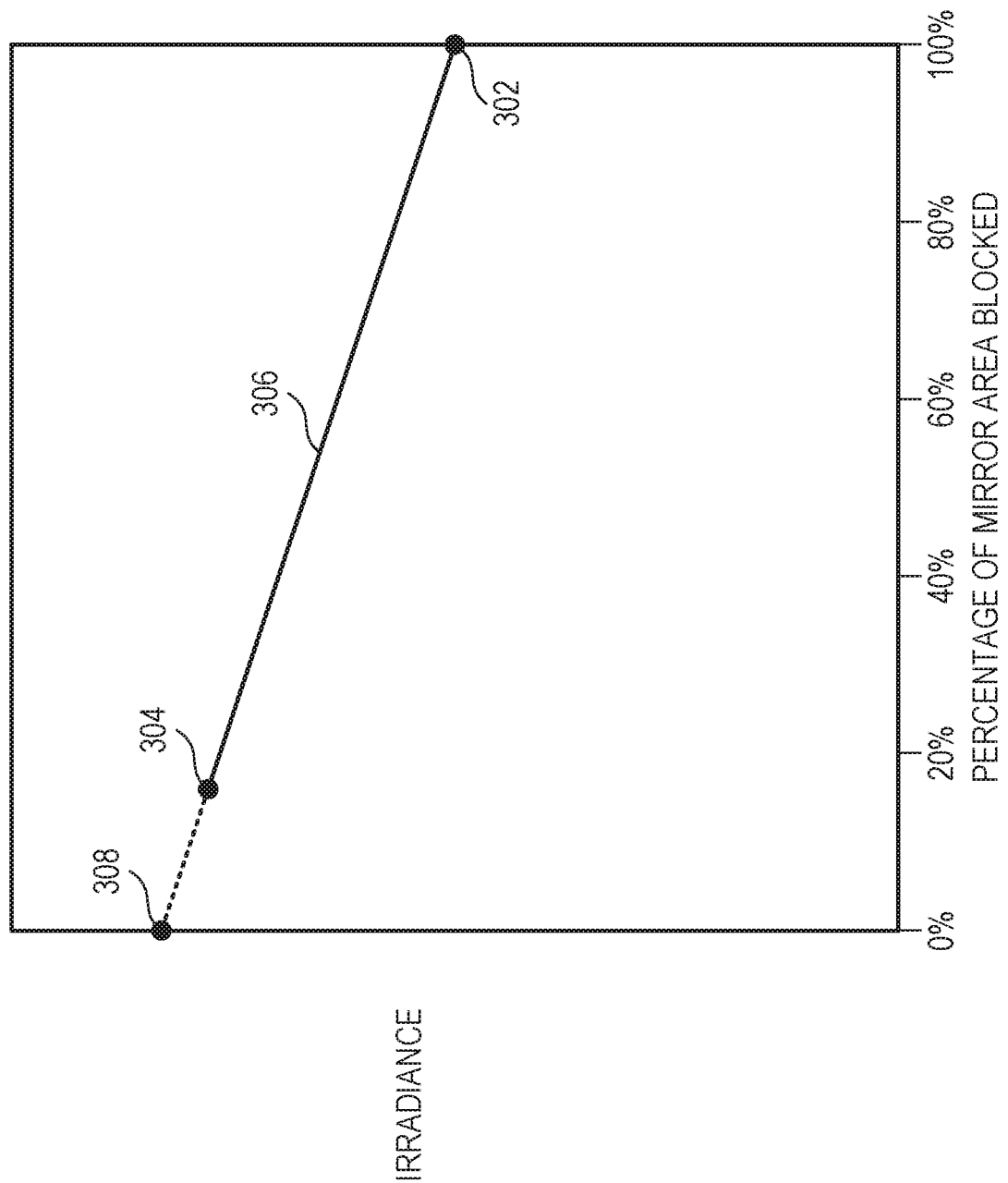
FIG. 3 shows an example of extrapolation used to determine the background irradiance, in accordance with some examples.

FIG. 3 shows an example of extrapolation used to determine the background irradiance (e.g., the irradiance of the sky away from the sun), in accordance with some examples. The extrapolation used in FIG. 3 can be applied to systems, such as the system 100 of FIG. 1, and methods, such as the method 200 of FIG. 2.

In some examples, the system can actuate a light baffle, proximate the mirror target, into an optical path between the mirror target and the foreoptics of the irradiance spectrometer, to block the reflection of the sun from the field of view of the irradiance spectrometer.

More specifically, the system can actuate a light baffle to block a first fraction of a mirror area of the mirror target such that the reflection of the sun from the mirror target is blocked from the field of view of the irradiance spectrometer. With the foreoptics of the irradiance spectrometer pointed directly at the mirror target while the first fraction of the mirror area is blocked, the system can take a fourth irradiance measurement with the irradiance spectrometer. The system can actuate a light baffle (either the same light baffle as previously discussed or a different light baffle) to block a second fraction, different from the first fraction, of the mirror area of the mirror target such that the reflection of the sun from the mirror target is blocked from the field of view of the irradiance spectrometer. With the foreoptics of the irradiance spectrometer pointed directly at the mirror target while the second fraction of the mirror area is blocked, the system can take a fifth irradiance measurement with the irradiance spectrometer. The at least one processor can extrapolate, from the fourth and fifth irradiance measurements, to calculate a sixth irradiance that represents a background irradiance from the reflection of the sky from the mirror target plus all other sources alight within the field of view of the irradiance spectrometer. This calculated sixth irradiance can be used to form the third irradiance discussed above. In some examples, one of the first fraction or the second fraction can be 100%, which can correspond to a non-mirror background bias (e.g., the other sources of light within the field of view of the irradiance spectrometer). In some examples, the extrapolation can correspond to a fraction of 0%.

FIG. 3 shows an example of extrapolation used to determine the background irradiance; in accordance with some embodiments. Data point 302 corresponds to the fourth irradiance measurement, in which 100% of the mirror area is blocked by the light baffle. Data point 304 corresponds to the fifth irradiance measurement, in which a percentage other than 100% of the mirror area is blocked by the light baffle. Note that the percentage can be determined by the particular application and the actual mirror or mirrors being measured. In practice, the percentage can be as small as possible; so as to give the most accurate result from the extrapolation, while still blocking the sun from the field of view of the irradiance spectrometer. In the example of FIG. 3, data point corresponds to about 16% of the mirror area being blocked; other suitable values can also be used. Once the data points 302 and 304 are plotted, the data points 302 and 304 can be connected by a line 306. The line 306 can be extended to a percentage value of 0%, which occurs at data point 308. The irradiance value at data point 308 is the extrapolated irradiance value, corresponding to the sixth irradiance discussed above. This is but one example of extrapolation being used to determine the background irradiance; other suitable techniques can also be used.

Figure 4:
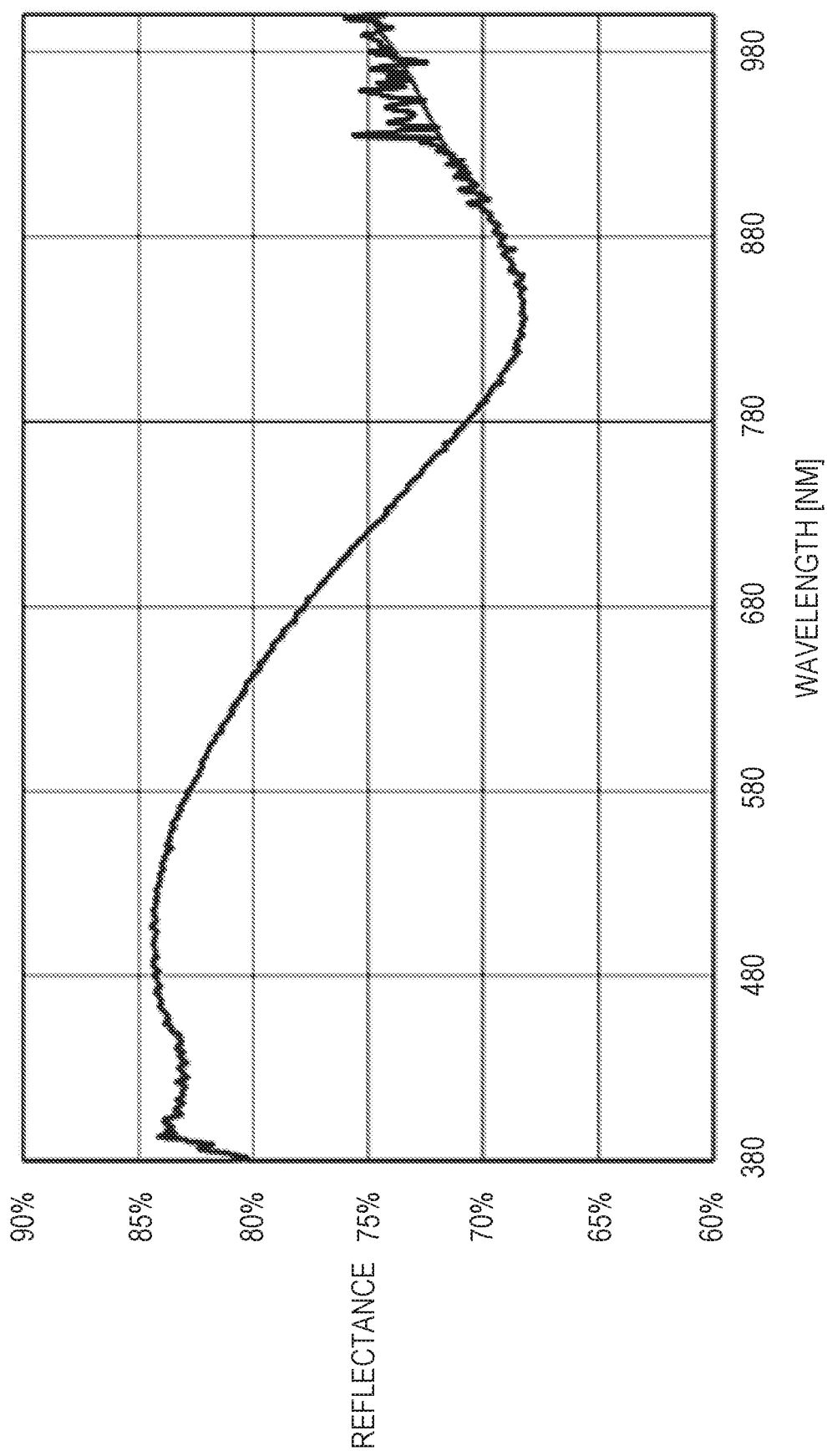
FIG. 4 shows a plot of an experimentally measured reflectance spectrum, accordance with some embodiments.

FIG. 4 shows a plot of an experimentally measured reflectance spectrum, in accordance with some embodiments. The mirror target included 55 identically shaped mirrors positioned in a mirror array. The separation between the irradiance spectrometer and the mirror array is 28.52 meters. The radius of curvature of each mirror is 0.377 meters. The processor has applied a smoothed spline interpolation to smooth the plotted curve for wavelength greater than about 800 nm, to reduce noise in the plotted curve caused by water absorption.

In the measured reflectance spectrum, the reflectance of the mirror rises from about 80% at a wavelength of 380 nm to about 83% a wavelength of around 400 nm, drops from 83% at a wavelength of around 550 nm to about 68% at a wavelength around 830 nm, then rises to about 75% at a wavelength around 1000 nm.

APPENDIX

This Appendix derives Eq. (1) from radiometric principles.

From Eq. (2) below, the intensity $I_m(\lambda)$ emanating from an image of the sun, radiating from a focal point of a spherical mirror, is expressed as:

$$I_m(\lambda) = \rho(\theta_i, \lambda) E_s(\lambda) R^2 / 4, \quad (2)$$

where the intensity $I_m(\lambda)$ is in units of power per solid angle (such as watts per steradian), quantity $\lambda$ is wavelength, quantity $\theta_i$ is an angle of incidence from the mirror with respect to a surface normal of the mirror, quantity $\rho(\theta_i, \lambda)$ is a specular reflectance of the mirror at the angle of incidence, quantity $E_s(\lambda)$ is a solar irradiance at the mirror surface in units of power per area per solid angle (such as watts per square meter per steradian), and quantity R is a radius of curvature of the mirror.

The derivation assumes that the solar image is effectively a point source, and that propagation of light away from the point source varies in accordance with an inverse square law. Based on energy conservation for a point source illuminating a full sphere (e.g., illumination into $4\pi$ steradians), an irradiance $E_m(H, \lambda)$, for any point within a field of view of a sensor at a distance H away from the solar image, is expressed as $$E_m(H, \lambda) = \frac{N \rho(\theta_i, \lambda) E_s(\lambda) R^2}{4H^2}, \quad (3)$$

where the irradiance $E_m(H, \lambda)$ is in units of power per area (such as watts per square meter), and quantity N is a number of identical mirrors in the mirror target. As with Eq. (2), quantity $\theta_i$ is an angle of incidence from the mirror with respect to a surface normal of the mirror, quantity $\rho(\theta_i, \lambda)$ is a specular reflectance of the mirror at the angle of incidence, quantity $E_s(\lambda)$ is a solar irradiance at the mirror surface in units of power per area per solid angle (such as watts per square meter per steradian), and quantity R is a radius of curvature of the mirror.

Assuming that the sun is infinitely far away from the mirror, it is straightforward to determine where the image of the sun is located with respect to the mirror. For a radius of curvature R, a distance H to the image, and a distance D to the surface (e.g., vertex) of the mirror, quantity H equals quantity (D+R/2) for a convex mirror and equals quantity (D−R/2) for a concave mirror.

The reflectance $\rho(\theta_i, \lambda)$ of the mirror can be expressed as:

$$\rho(\theta_i, \lambda) = \frac{4H^2 E_m(H, \lambda)}{N E_s(\lambda) R^2}, \quad (4)$$

where quantity H is a distance to the image of the sun, quantity $E_m(H, \lambda)$ is the irradiance of light reflected from the mirror, quantity N is a number of identical mirrors in the mirror target, quantity $E_s(\lambda)$ is a solar irradiance at the mirror surface, and quantity R is a radius of curvature of the mirror.

The first irradiance measurement discussed above, which measures an irradiance of the sun, involves pointing the foreoptics directly at the sun. This first irradiance measurement measures the quantity $E_s(\lambda)$, which is a solar irradiance at the mirror surface. It is assumed that the solar irradiance does not vary over time, and does not vary between a location of the foreoptics and a location of the mirror.

The second irradiance measurement discussed above, which measures an irradiance from a reflection of the sun from the mirror target plus background irradiance, involves pointing the foreoptics of the irradiance spectrometer directly at the mirror target such that a reflection of the sun from the mirror target is within the field of view of the irradiance spectrometer. It is assumed that the first and second irradiance measurement are taken over a short enough time interval that the atmospheric transmittance remains stable.

We wish to have a measurement of the irradiance from a reflection of the sun from the mirror, but without the background irradiance (e.g. from the sky plus other light sources and/or reflection within the field of view of the irradiance spectrometer). In some cases, such as when the mirror target (or mirrors in the mirror target) are tiltable, it is possible to obtain a third irradiance measurement of just the sky near the sun, without having the sun in the field of view. This third irradiance measurement can measure the background irradiance directly, so that it may be subtracted from the second irradiance measurement (e.g., the irradiance of the sun plus the background irradiance).

In other cases, such as when the mirror target (or mirrors in the mirror target) are not tiltable or do not tilt far enough to remove the sun from the field of view of the irradiance spectrometer, determining the background irradiance $E_m(H, \lambda)$ can require additional measurement steps.

Step 1, performed above, can measure the solar irradiance.

Step 2 can measure the irradiance incident within the spectrometer field of view, so that the response includes the mirror target and the background signal $E_{m+b}$. The steps that follow can isolate the direct solar contribution.

Step 3 covers 100% of the mirror area and measures a resulting irradiance, $E_b(100\%, \lambda)$. This measurement contains everything in the field of view of the irradiance spectrometer except the sun and the background sky reflected by the mirrors.

Step 4 covers a known fractional area of the mirror(s), such as with opaque strips, so that the virtual image of the sun is blocked but a portion of the sky is not blocked. Step 4 then measures an irradiance of the portion of the sky. As a numerical example, the opaque strips can cover 11.6% of the mirror area (although any suitable value can also be used). Measurement with 11.6% of the mirror area blocked can produce a resulting irradiance $E_b(11.6\%, \lambda)$.

Step 5 extrapolates from the measured irradiances $E_b(100\%, \lambda)$ and $E_b(11.6\%, \lambda)$ to determine what an irradiance $E_b(0\%, \lambda)$ would be for a measurement of the full mirror (e.g., unblocked) with just the sky contributing to the irradiance. As explained above, such a measurement cannot be taken directly, due to the presence of the sun and the inability to reposition the image of the sun to be out of the field of view of the irradiance spectrometer. The quantity $E_b(0\%, \lambda)$ can be written as simply $E_b$.

With quantities $E_s$, $E_{m+b}$, and $E_b$ determined at each wavelength $\lambda$, the mirror reflectance, as a function of wavelength, is expressed as:

$$\rho(\lambda) = \frac{4NH^2}{R^2} \frac{E_m(H, \lambda)}{E_S(\lambda)} = \frac{4H^2}{R^2} \frac{(E_{m+b}(H, \lambda) - E_b(H, \lambda))}{E_S(\lambda)}$$

(5)

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

STATEMENT OF INDUSTRIAL APPLICABILITY

This disclosure has application in equipment maintenance, particularly determining that a mirror and/or a mirror array is functioning properly.

EXAMPLES

To further illustrate the device and related method disclosed herein, a non-limiting list of examples is provided below. Each of the following non-limiting examples can stand on its own, or can be combined in any permutation or combination with any one or more of the other examples.

In Example 1, a method for monitoring a reflectance of a mirror target that includes at least one curved mirror can include: obtaining a first irradiance measurement of the sun, the first irradiance measurement representing a direct solar irradiance; obtaining a second irradiance measurement that represents an irradiance from a reflection of the sun from the mirror target plus background irradiance; obtaining a third irradiance measurement that represents the background irradiance; determining a reflectance of the mirror target from the first, second, and third irradiance measurements; determining that the reflectance of the mirror target is less than a specified reflectance threshold; and in response to the determination that the reflectance of the mirror target is less than the specified reflectance threshold, generating an alert signal.

In Example 2, the method of Example 1 can optionally be configured such that obtaining the first irradiance measurement comprises taking the first irradiance measurement of the sun; obtaining the second irradiance measurement comprises taking the second irradiance measurement from a reflection of the sky from the mirror target; and obtaining the third irradiance measurement comprises taking the third irradiance measurement from the reflection of the sky from the mirror target.

In Example 3, the method of any one of Examples 1-2 can optionally be configured such that the first, second, and third irradiance measurements are taken within a specified time frame, to reduce or minimize atmospheric effects on the first; second, and third irradiance measurements.

In Example 4, the method of any one of Examples 1-3 can optionally be configured such that taking the first irradiance measurement comprises: pointing foreoptics of an irradiance spectrometer directly at the sun such that the sun is within a field of view of the irradiance spectrometer; and with the foreoptics of the irradiance spectrometer pointed directly at the sun while the sun is within the field of view of the irradiance spectrometer, taking the first irradiance measurement with the irradiance spectrometer.

In Example 5, the method of any one of Examples 1-4 can optionally be configured such that taking the second irradiance measurement comprises: pointing the foreoptics of the irradiance spectrometer directly at the mirror target such that a reflection of the sun from the mirror target is within the field of view of the irradiance spectrometer; and with the foreoptics of the irradiance spectrometer pointed directly at the mirror target while the reflection of the sun from the mirror target is within the field of view of the irradiance spectrometer, taking the second irradiance measurement with the irradiance spectrometer.

In Example 6, the method of any one of Examples 1-5 can optionally be configured such that taking the third irradiance measurement comprises: removing the reflection of the sun from the field of view of the irradiance spectrometer; and with the foreoptics of the irradiance spectrometer pointed directly at the mirror target while the reflection of the sun is removed from the field of view of the irradiance spectrometer, taking the third irradiance measurement with the irradiance spectrometer.

In Example 7, the method of any one of Examples 1-6 can optionally be configured such that removing the reflection of the sun from the field of view of the irradiance spectrometer comprises: rotating the mirror target to reposition the reflection of the sun from the mirror target to lie outside the field of view of the irradiance spectrometer.

In Example 8, the method of any one of Examples 1-7 can optionally be configured such that removing the reflection of the sun from the field of view of the irradiance spectrometer comprises: actuating a light baffle, proximate the mirror target; into an optical path between the mirror target and the foreoptics of the irradiance spectrometer to block the reflection of the sun from the field of view of the irradiance spectrometer.

In Example 9, the method of any one of Examples 1-8 can optionally be configured such that removing the reflection of the sun from the field of view of the irradiance spectrometer comprises: actuating a light baffle to block a first fraction of a mirror area of the mirror target such that the reflection of the sun from the mirror target is blocked from the field of view of the irradiance spectrometer; with the foreoptics of the irradiance spectrometer pointed directly at the mirror target while the first fraction of the mirror area is blocked, taking a fourth irradiance measurement with the irradiance spectrometer; actuating a light baffle to block a second fraction, different from the first fraction, of the mirror area of the mirror target such that the reflection of the sun from the mirror target is blocked from the field of view of the irradiance spectrometer; with the foreoptics of the irradiance spectrometer pointed directly at the mirror target while the second fraction of the mirror area is blocked, taking a fifth irradiance measurement with the irradiance spectrometer; extrapolating, with at least one processor, from the fourth and fifth irradiance measurements, to calculate a sixth irradiance that represents a background irradiance from the reflection of the sky from the mirror target and from non-mirror light sources in the field of view of the irradiance spectrometer.

In Example 10, the method of any one of Examples 1-9 can optionally be configured such that one of the first fraction or the second fraction is 100%; and the extrapolation corresponds to a fraction of 0%.

In Example 11, the method of any one of Examples 1-10 can optionally be configured such that determining the reflectance of the mirror target from the first, second, and third irradiance measurements comprises: calculating a difference between the second irradiance measurement and the third irradiance measurement; and dividing the difference by the first irradiance measurement.

In Example 12, the method of any one of Examples 1-11 can optionally be configured such that determining the reflectance of the mirror target comprises calculating, with at least one processor, a quantity $$\rho(\lambda) = \frac{4H^2}{R^2} \frac{(E_{m+b}(H, \lambda) - E_b(H, \lambda))}{E_S(\lambda)}$$

where: quantity $\lambda$ is a wavelength, quantity $\rho(\lambda)$ is a reflectance of the mirror target as a function of wavelength, quantity H is a distance from the irradiance spectrometer to an image of the sun as formed by the mirror target, quantity R is a radius of curvature of the at least one curved mirror in the mirror target, quantity $E_S(\lambda)$ is the first irradiance measurement, quantity $E_{m+b}(H, \lambda)$ is the second irradiance measurement, and quantity $E_b(H, \lambda)$ is the third irradiance measurement.

In Example 13, a system to measure a reflectance of a mirror target that includes at least one curved mirror can include: an irradiance spectrometer; a spectrometer actuator configured to control an orientation of the irradiance spectrometer; at least one processor to control the irradiance spectrometer and the spectrometer actuator, the at least one processor configured to: point foreoptics of the irradiance spectrometer directly at the sun such that the sun is within a field of view of the irradiance spectrometer; with the foreoptics of the irradiance spectrometer pointed directly at the sun while the sun is within the field of view of the irradiance spectrometer, obtain a first irradiance measurement with the irradiance spectrometer; point the foreoptics of the irradiance spectrometer directly at the mirror target such that a reflection of the sun from the mirror target is within the field of view of the irradiance spectrometer; with the foreoptics of the irradiance spectrometer pointed directly at the mirror target while the reflection of the sun from the mirror target is within the field of view of the irradiance spectrometer, obtain a second irradiance measurement with the irradiance spectrometer; removing the reflection of the sun from the field of view of the irradiance spectrometer; with the foreoptics of the irradiance spectrometer pointed directly at the mirror target while the reflection of the sun is removed from the field of view of the irradiance spectrometer, obtain a third irradiance measurement with the irradiance spectrometer; and determine a reflectance of the mirror target from the first, second, and third irradiance measurements.

In Example 14, the system of Example 13 can optionally be configured such that obtaining the first irradiance measurement comprises taking the first irradiance measurement of the sun; obtaining the second irradiance measurement comprises taking the second irradiance measurement from a reflection of the sky from the mirror target; and obtaining the third irradiance measurement comprises taking the third irradiance measurement from the reflection of the sky from the mirror target.

In Example 15, the system of any one of Examples 13-14 can optionally be configured such that the at least one processor is further configured to take the first, second, and third irradiance measurements within a specified time frame, to reduce or minimize atmospheric effects on the first, second, and third irradiance measurements.

In Example 16, the system of any one of Examples 13-15 can optionally be configured such that the at least one processor is further configured to: determine that the reflectance of the mirror target is less than a specified reflectance threshold; and in response to the determination that that the reflectance of the mirror target is less than the specified reflectance threshold, automatically generate an alert signal.

In Example 17, the system of any one of Examples 13-16 can optionally be configured such that the first irradiance measurement represents a direct solar irradiance; the second irradiance measurement represents an irradiance from a reflection of the sun from the mirror target plus background irradiance from a reflection of the sky from the mirror target; and the third irradiance measurement represents the background irradiance from the reflection of the sky from the mirror target.

In Example 18, the system of any one of Examples 13-17 can optionally be configured such that determining the reflectance of the mirror target from the first, second, and third irradiance measurements comprises: calculating a difference between the second irradiance measurement and the third irradiance measurement; and dividing the difference by the first irradiance measurement.

In Example 19, the system of any one of Examples 13-18 can optionally be configured such that the at least one processor is further configured to determine the reflectance by calculating a quantity $$\rho(\lambda) = \frac{4H^2}{R^2} \frac{(E_{m+b}(H, \lambda) - E_b(H, \lambda))}{E_S(\lambda)}$$

where: quantity A is a wavelength, quantity $\rho(\lambda)$ is a reflectance of the mirror target as a function of wavelength, quantity H is a distance from the irradiance spectrometer to an image of the sun as formed by the mirror target, quantity R is a radius of curvature of the at least one curved mirror in the mirror target, quantity $E_S(\lambda)$ is the first irradiance measurement; quantity $E_{m+b}(H, \lambda)$ is the second irradiance measurement, and quantity $E_b(H, \lambda)$ is the third irradiance measurement.

In Example 20, a method for measuring a reflectance of a mirror target that includes at least one curved mirror can include: pointing foreoptics of an irradiance spectrometer directly at the sun such that the sun is within a field of view of the irradiance spectrometer; with the foreoptics of the irradiance spectrometer pointed directly at the sun while the sun is within the field of view of the irradiance spectrometer, taking a first irradiance measurement with the irradiance spectrometer, the first irradiance measurement representing a direct solar irradiance; pointing the foreoptics of the irradiance spectrometer directly at the mirror target such that a reflection of the sun from the mirror target is within the field of view of the irradiance spectrometer; with the foreoptics of the irradiance spectrometer pointed directly at the mirror target while the reflection of the sun from the mirror target is within the field of view of the irradiance spectrometer, taking a second irradiance measurement with the irradiance spectrometer, the second irradiance measurement representing an irradiance from a reflection of the sun from the mirror target plus background irradiance from a reflection of the sky from the mirror target; removing the reflection of the sun from the field of view of the irradiance spectrometer; with the foreoptics of the irradiance spectrometer pointed directly at the mirror target while the reflection of the sun is removed from the field of view of the irradiance spectrometer, taking a third irradiance measurement with the irradiance spectrometer, the third irradiance measurement representing the background irradiance from the reflection of the sky from the mirror target; and determining, with at least one processor coupled to the irradiance spectrometer, a reflectance of the mirror target from the first, second, and third irradiance measurements; determining, with the at least one processor, that the reflectance of the mirror target is less than a specified reflectance threshold; and in response to the determination that the reflectance of the mirror target is less than the specified reflectance threshold, automatically generating an alert signal.

What is claimed is:

1. A method for monitoring a reflectance of a mirror target that includes at least one curved mirror, the method comprising:
    obtaining a first irradiance measurement of the sun, the first irradiance measurement representing a direct solar irradiance;
    obtaining a second irradiance measurement that represents an irradiance from a reflection of the sun from the mirror target plus background irradiance;
    obtaining a third irradiance measurement that represents the background irradiance;
    determining a reflectance of the mirror target from the first, second, and third irradiance measurements;
    determining that the reflectance of the mirror target is less than a specified reflectance threshold; and
    in response to the determination that the reflectance of the mirror target is less than the specified reflectance threshold, generating an alert signal.

2. The method of claim 1, wherein:
    obtaining the first irradiance measurement comprises taking the first irradiance measurement of the sun;
    obtaining the second irradiance measurement comprises taking the second irradiance measurement from a reflection of the sky from the mirror target; and
    obtaining the third irradiance measurement comprises taking the third irradiance measurement from the reflection of the sky from the mirror target.

3. The method of claim 2, wherein the first, second, and third irradiance measurements are taken within a specified time frame, to reduce or minimize atmospheric effects on the first, second, and third irradiance measurements.

4. The method of claim 2, wherein taking the first irradiance measurement comprises:
    pointing foreoptics of an irradiance spectrometer directly at the sun such that the sun is within a field of view of the irradiance spectrometer; and
    with the foreoptics of the irradiance spectrometer pointed directly at the sun while the sun is within the field of view of the irradiance spectrometer, taking the first irradiance measurement with the irradiance spectrometer.

5. The method of claim 4, wherein taking the second irradiance measurement comprises:
    pointing the foreoptics of the irradiance spectrometer directly at the mirror target such that a reflection of the sun from the mirror target is within the field of view of the irradiance spectrometer; and
    with the foreoptics of the irradiance spectrometer pointed directly at the mirror target while the reflection of the sun from the mirror target is within the field of view of the irradiance spectrometer, taking the second irradiance measurement with the irradiance spectrometer.

6. The method of claim 5, wherein taking the third irradiance measurement comprises:
    removing the reflection of the sun from the field of view of the irradiance spectrometer; and
    with the foreoptics of the irradiance spectrometer pointed directly at the mirror target while the reflection of the sun is removed from the field of view of the irradiance spectrometer, taking the third irradiance measurement with the irradiance spectrometer.

7. The method of claim 6, wherein removing the reflection of the sun from the field of view of the irradiance spectrometer comprises:
    rotating the mirror target to reposition the reflection of the sun from the mirror target to lie outside the field of view of the irradiance spectrometer.

8. The method of claim 7, wherein removing the reflection of the sun from the field of view of the irradiance spectrometer comprises:
    actuating a light baffle, proximate the mirror target, into an optical path between the mirror target and the foreoptics of the irradiance spectrometer to block the reflection of the sun from the field of view of the irradiance spectrometer.

9. The method of claim 6, wherein removing the reflection of the sun from the field of view of the irradiance spectrometer comprises:
    actuating a light baffle to block a first fraction of a mirror area of the mirror target such that the reflection of the sun from the mirror target is blocked from the field of view of the irradiance spectrometer;
    with the foreoptics of the irradiance spectrometer pointed directly at the mirror target while the first fraction of the mirror area is blocked, taking a fourth irradiance measurement with the irradiance spectrometer;
    actuating a light baffle to block a second fraction, different from the first fraction, of the mirror area of the mirror target such that the reflection of the sun from the mirror target is blocked from the field of view of the irradiance spectrometer;
    with the foreoptics of the irradiance spectrometer pointed directly at the mirror target while the second fraction of the mirror area is blocked, taking a fifth irradiance measurement with the irradiance spectrometer; and extrapolating, with at least one processor, from the fourth and fifth irradiance measurements, to calculate a sixth irradiance that represents a background irradiance from the reflection of the sky from the mirror target and from non-mirror light sources in the field of view of the irradiance spectrometer.

10. The method of claim 9, wherein:
one of the first fraction or the second fraction is 100%; and
the extrapolation corresponds to a fraction of 0%.

11. The method of claim 1, wherein determining the reflectance of the mirror target from the first, second, and third irradiance measurements comprises:
calculating a difference between the second irradiance measurement and the third irradiance measurement; and
dividing the difference by the first irradiance measurement.

12. The method of claim 11, wherein determining the reflectance of the mirror target comprises calculating, with at least one processor; a quantity $$\rho(\lambda) = \frac{4H^2}{R^2} \frac{(E_{m+b}(H, \lambda) - E_b(H, \lambda))}{E_S(\lambda)}$$

where:
quantity $\lambda$ is a wavelength,
quantity $\rho(\lambda)$ is a reflectance of the mirror target as a function of wavelength,
quantity H is a distance from the irradiance spectrometer to an image of the sun as formed by the mirror target;
quantity R is a radius of curvature of the at least one curved mirror in the mirror target,
quantity $E_S(\lambda)$ is the first irradiance measurement,
quantity $E_{m+b}(H, \lambda)$ is the second irradiance measurement, and
quantity $E_b(H, \lambda)$ is the third irradiance measurement.

13. A system to measure a reflectance of a mirror target that includes at least one curved mirror, the system comprising:
an irradiance spectrometer;
a spectrometer actuator configured to control an orientation of the irradiance spectrometer;
at least one processor to control the irradiance spectrometer and the spectrometer actuator, the at least one processor configured to:
point foreoptics of the irradiance spectrometer directly at the sun such that the sun is within a field of view of the irradiance spectrometer;
with the foreoptics of the irradiance spectrometer pointed directly at the sun while the sun is within the field of view of the irradiance spectrometer, obtain a first irradiance measurement with the irradiance spectrometer;
point the foreoptics of the irradiance spectrometer directly at the mirror target such that a reflection of the sun from the mirror target is within the field of view of the irradiance spectrometer;
with the foreoptics of the irradiance spectrometer pointed directly at the mirror target while the reflection of the sun from the mirror target is within the field of view of the irradiance spectrometer, obtain a second irradiance measurement with the irradiance spectrometer;
removing the reflection of the sun from the field of view of the irradiance spectrometer;
with the foreoptics of the irradiance spectrometer pointed directly at the mirror target while the reflection of the sun is removed from the field of view of the irradiance spectrometer, obtain a third irradiance measurement with the irradiance spectrometer; and
determine a reflectance of the mirror target from the first, second, and third irradiance measurements.

14. The system of claim 13, wherein:
obtaining the first irradiance measurement comprises taking the first irradiance measurement of the sun;
obtaining the second irradiance measurement comprises taking the second irradiance measurement from a reflection of the sky from the mirror target; and
obtaining the third irradiance measurement comprises taking the third irradiance measurement from the reflection of the sky from the mirror target.

15. The system of claim 14, wherein the at least one processor is further configured to take the first, second, and third irradiance measurements within a specified time frame, to reduce or minimize atmospheric effects on the first, second, and third irradiance measurements.

16. The system of claim 14, wherein the at least one processor is further configured to:
determine that the reflectance of the mirror target is less than a specified reflectance threshold; and
in response to the determination that that the reflectance of the mirror target is less than the specified reflectance threshold, automatically generate an alert signal.

17. The system of claim 14, wherein:
the first irradiance measurement represents a direct solar irradiance;
the second irradiance measurement represents an irradiance from a reflection of the sun from the mirror target plus background irradiance from a reflection of the sky from the mirror target; and
the third irradiance measurement represents the background irradiance from the reflection of the sky from the mirror target.

18. The system of claim 13, wherein determining the reflectance of the mirror target from the first, second, and third irradiance measurements comprises:
calculating a difference between the second irradiance measurement and the third irradiance measurement; and
dividing the difference by the first irradiance measurement.

19. The system of claim 18, wherein the at least one processor is further configured to determine the reflectance by calculating a quantity $$\rho(\lambda) = \frac{4H^2}{R^2} \frac{(E_{m+b}(H, \lambda) - E_b(H, \lambda))}{E_S(\lambda)}$$

where:
quantity $\lambda$ is a wavelength,
quantity $\rho(\lambda)$ is a reflectance of the mirror target as a function of wavelength,
quantity H is a distance from the irradiance spectrometer to an image of the sun as formed by the mirror target,
quantity R is a radius of curvature of the at least one curved mirror in the mirror target,
quantity $E_S(\lambda)$ is the first irradiance measurement, quantity $E_{m+b}(H, \lambda)$ is the second irradiance measurement, and quantity $E_b(H, \lambda)$ is the third irradiance measurement.

20. A method for measuring a reflectance of a mirror target that includes at least one curved mirror, the method comprising:

pointing foreoptics of an irradiance spectrometer directly at the sun such that the sun is within a field of view of the irradiance spectrometer;

with the foreoptics of the irradiance spectrometer pointed directly at the sun while the sun is within the field of view of the irradiance spectrometer, taking a first irradiance measurement with the irradiance spectrometer, the first irradiance measurement representing a direct solar irradiance;

pointing the foreoptics of the irradiance spectrometer directly at the mirror target such that a reflection of the sun from the mirror target is within the field of view of the irradiance spectrometer;

with the foreoptics of the irradiance spectrometer pointed directly at the mirror target while the reflection of the sun from the mirror target is within the field of view of the irradiance spectrometer, taking a second irradiance measurement with the irradiance spectrometer, the second irradiance measurement representing an irradiance from a reflection of the sun from the mirror target plus background irradiance from a reflection of the sky from the mirror target;

removing the reflection of the sun from the field of view of the irradiance spectrometer;

with the foreoptics of the irradiance spectrometer pointed directly at the mirror target while the reflection of the sun is removed from the field of view of the irradiance spectrometer, taking a third irradiance measurement with the irradiance spectrometer, the third irradiance measurement representing the background irradiance from the reflection of the sky from the mirror target; and determining, with at least one processor coupled to the irradiance spectrometer, a reflectance of the mirror target from the first, second, and third irradiance measurements;

determining, with the at least one processor, that the reflectance of the mirror target is less than a specified reflectance threshold; and in response to the determination that the reflectance of the mirror target is less than the specified reflectance threshold, automatically generating an alert signal.

* * * * *

UNITED STATES PATENT AND TRADEMARK OFFICE
CERTIFICATE OF CORRECTION

PATENT NO. : 11,971,321 B2
APPLICATION NO. : 17/612102
DATED : April 30, 2024
INVENTOR(S) : Stephen J. Schiller It is certified that error appears in the above-identified patent and that said Letters Patent is hereby corrected as shown below:

On the Title Page

On page 2, in Column 1, under item (56) "Other Publications", Line 7, after "(Dec. 1, 2015).", insert --""International Application Serial No. PCT/US2019/033463, International Preliminary Report on Patentability dated Dec. 2, 2021."", 9 pgs.--

In the Specification

In Column 1, Line 63, delete "spectrometer;" and insert --spectrometer,-- therefor In Column 2, Line 4, delete "first;" and insert --first,-- therefor In Column 2, Line 56, before "accordance", insert --in --

In Column 3, Line 53, delete "area;" and insert --area,-- therefor

In Column 3, Line 54, delete "international" and insert --International-- therefor In Column 4, Line 8, delete "106;" and insert --106,-- therefor In Column 4, Line 35, after "one", delete "TO"

In Column 5, Line 47, delete "(NI)" and insert --(M)-- therefor

In Column 5, Line 61, delete "(NI)" and insert --(M)-- therefor

In Column 6, Line 13, delete "(NI)" and insert --(M)-- therefor

In Column 7, Line 2, delete "sky," and insert --sky-- therefor

Signed and Sealed this
Twenty-eighth Day of January, 2025

Coke Morgan Stewart
*Acting Director of the United States Patent and Trademark Office*

CERTIFICATE OF CORRECTION (continued)
U.S. Pat. No. 11,971,321 B2

In Column 7, Line 60, after "to", delete "TO"

In Column 8, Line 42, delete "alight" and insert --of light-- therefor

In Column 8, Line 61, delete "possible;" and insert --possible,-- therefor

In Column 10, Line 56, delete "signal $E_{m+b}$," and insert --signal, $E_{m+b}$.-- therefor In Column 12, Line 16, delete "first;" and insert --first,-- therefor In Column 12, Line 57, delete "target;" and insert --target,-- therefor In Column 14, Line 59, delete "A" and insert --$\lambda$-- therefor In Column 14, Line 65, delete "measurement;" and insert --measurement,-- therefor In the Claims In Column 17, Line 22, in Claim 12, delete "processor;" and insert --processor,-- therefor In Column 17, Line 34, in Claim 12, delete "target;" and insert --target,-- therefor